Jan. 12, 1960 G. F. COUCH 2,920,501
SLACK ADJUSTER
Filed Nov. 27, 1953 2 Sheets-Sheet 1
*Fig. 1.*
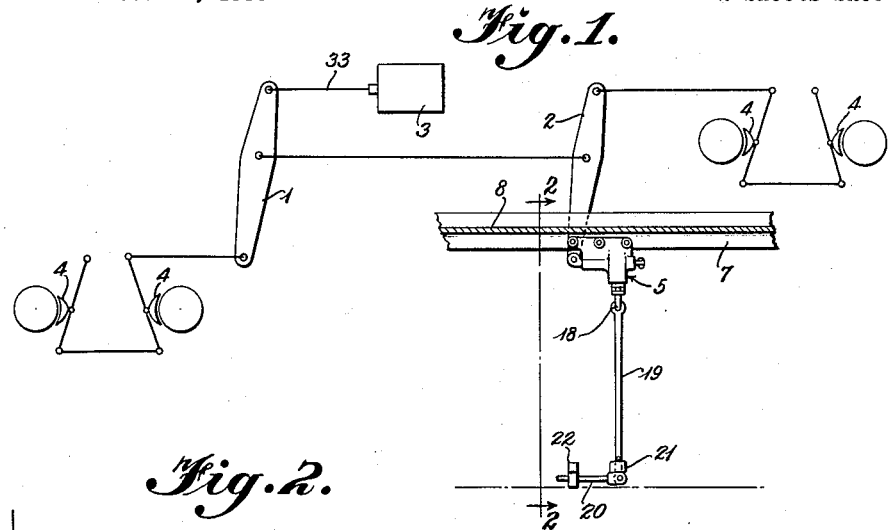
*Fig. 2.*
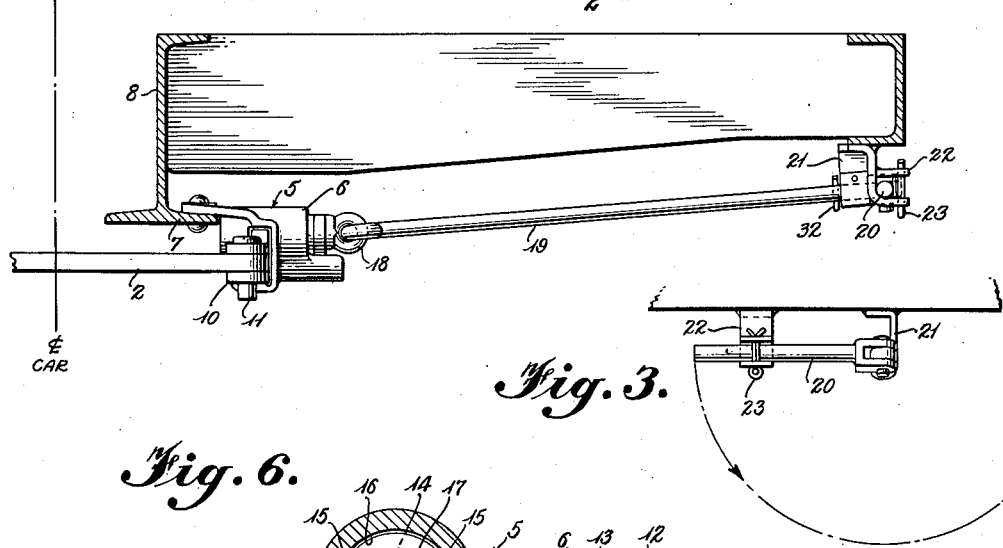
*Fig. 3.*
*Fig. 6.*
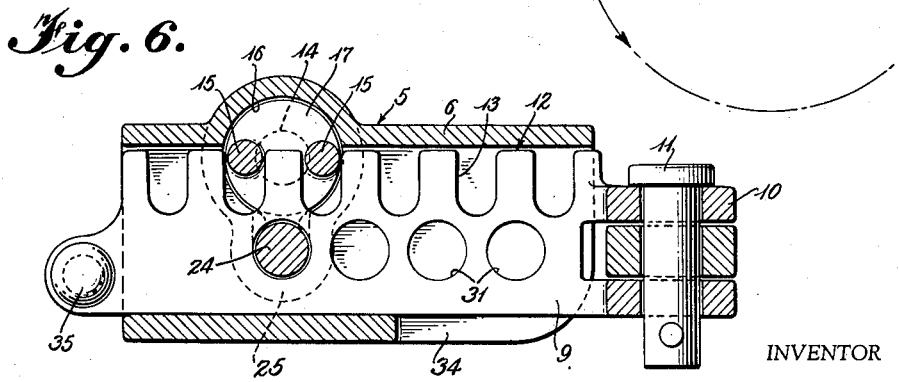
INVENTOR
Glenn F. Couch
BY Wilmer Mechlin
ATTORNEY

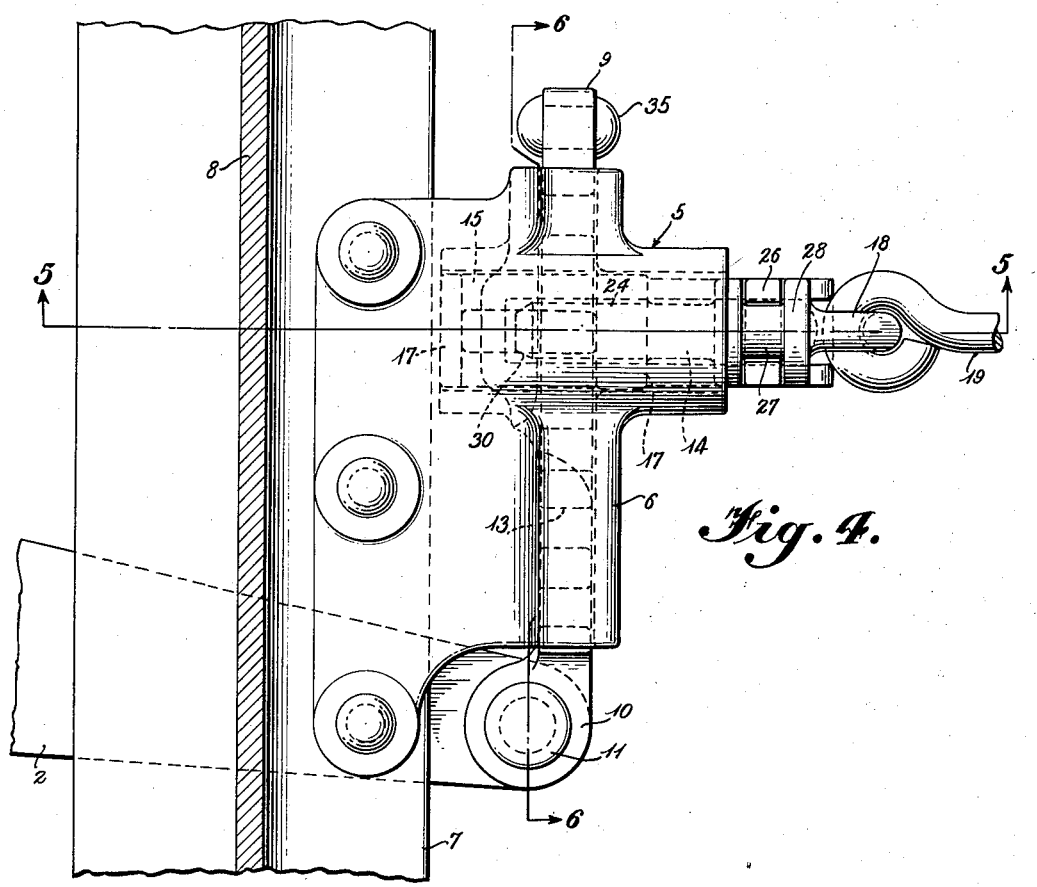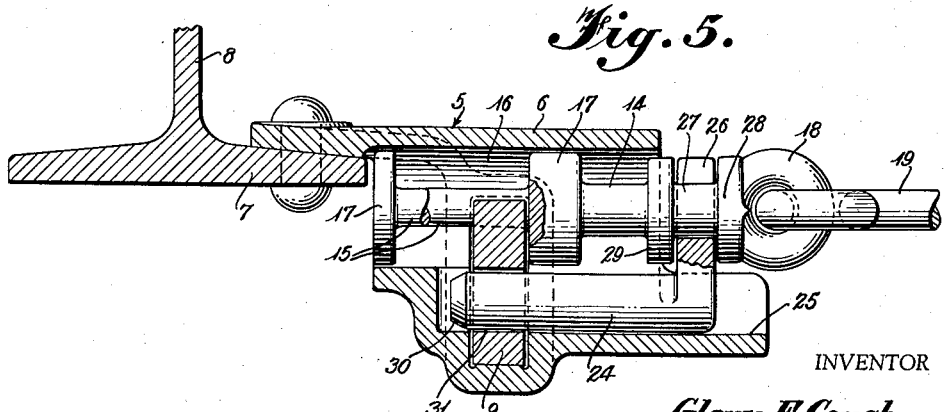

United States Patent Office 2,920,501
Patented Jan. 12, 1960

2,920,501

SLACK ADJUSTER

Glenn F. Couch, Williamsville, N.Y., assignor to Symington Wayne Corporation, a corporation of Maryland Application November 27, 1953, Serial No. 394,740

13 Claims. (Cl. 74—522)

This invention relates to brake rigging for railway cars and more particularly to brake slack adjusters.

The primary object of the invention is to provide an improved slack adjuster for taking up slack in brake rigging by shifting the fulcrum of one of the brake levers.

Another object of the invention is to provide an improved brake slack adjuster whereby the fulcrum of a brake lever may be both shifted in position and locked in shifted position.

An additional object of the invention is to provide an improved brake slack adjuster, capable of shifting the fulcrum of a brake lever and locking the fulcrum in shifted position, which may be operated from the side of the railway car to which it is applied.

A further object of the invention is to provide a brake slack adjuster for brake rigging of a railway car, wherein a rack and pinion mounted on the car body and operable from the side of the car, are utilized to shift the position of the fulcrum of the dead brake lever.

Another object of the invention is to provide a brake slack adjuster utilizing a rack and pinion for shifting the fulcrum of the dead lever and containing means for locking the rack and therethrough the fulcrum in shifted position.

Other objects and advantages of the invention will appear hereinafter in the detailed description, be particularly pointed out in the appended claims, and be illustrated in the accompanying drawings, in which:

Figure 1 is a schematic view of brake rigging embodying a preferred form of the slack adjuster of the present invention.

Figure 2 is a fragmentary sectional view on an enlarged scale taken along the lines 2—2 of Figure 1.

Figure 3 is a fragmentary side elevational view on the scale of Figure 2, showing the mounting of the operating handle of the slack adjuster of Figure 1.

Figure 4 is a plan view on an enlarged scale of the slack adjuster of Figure 2, with the operating handle and a portion of the connecting linkage removed.

Figure 5 is a vertical sectional view taken along the lines 5—5 of Figure 4; and Figure 6 is a vertical sectional view taken along the lines 6—6 of Figure 4.

Referring now in detail to the drawings in which like reference characters designate like parts, and first to Figure 1, there is there shown, schematically, a typical brake rigging in which a pair of brake levers, connected intermediate their ends, one a cylinder or live lever 1, and the other a dead or floating lever 2, are utilized to apply force from a brake cylinder 3 to the brakes 4. One of these levers, conventionally the dead lever 2, is deaded to provide a reactance to the applied force by fixing its fulcrum relative to the body (not shown) of a railway car or in some cases to a railway truck. The improved brake slack adjuster of the present invention, designated generally as 5, is particularly adapted for use with brake rigging in which a brake lever is pivotally connected or deaded to the car body and in the illustrated embodiment is shown as fulcruming the lever conventionally deaded, the dead lever 2.

In its preferred and illustrated form, the slack adjuster 5 is comprised of a housing 6 adapted to be mounted and fixed in position, relative to the underside of a railway car, as by connecting it by rivets to a bottom flange 7 of a center sill 8. Slidably or shiftably mounted in the housing and extending therethrough, longitudinally of the car, a reicprocable rack or rack bar 9, on one end of which is fulcrumed the dead lever 2, the rack for this purpose conveniently having that end formed as a clevis 10 straddling and pivotally connected to one end of the dead lever by a pivot pin 11. Intermediate its ends, a longitudinal edge of the rack 9, here preferably its upper edge 12, is serrated or grooved to provide a plurality of longitudinal spaced grooves 13.

The rack 9 is driven by a pinion 14, the latter having, as its driving means, in lieu of conventional teeth, a pair of preferably cylindrical pins or fingers 15 offset from the axis of the pinion 14 and spaced on opposite sides of that axis a distance corresponding to the distance between centers of the grooves 13. With the pins 15 so arranged, rotation of the pinion through 180° causes one of the pins to engage the confronting grooves 13 of the rack 9 and move, shift, or reciprocate the latter in one direction or the other, depending on the direction of rotation of the pinion, a distance corresponding to the spacing between centers of the grooves. To mount the pinion, the housing 6 is provided with a cylindrical recess 16 extending transversely of both rack and housing and into which the rack projects, the pinion being journaled and guided by spaced hubs or hub portions 17 which the pins 15 connect.

For rotating the pinion 14 and thereby driving the rack 9, the pinion may have its outer end formed as an eye 18, through which it is connected by a connecting link 19 to an operating bar or handle 20 at a side of the vehicle. The connecting rod is mounted for rotation about its longitudinal axis by a bracket 21 attached, as by welding, to the underside of the car body, and is made rotatable about that axis by pivotally connecting it to the operating handle 20, the latter being pivotal normal to the rotative axis of the connecting rod. A second bracket 22, spaced from the first, is provided at the side of the car to seat the operating handle when not in operation, the handle being lockable in the bracket, as by a cotter pin 23.

With the above arrangement, the fulcrum of the dead lever 2 can be shifted, as desired, to compensate for slack in the brake rigging. However, in such case, locking of the operating handle 20 in the handle-locking bracket 22 would be the only deterrent to shifting of the rack 9 on the application of force to the brakes. It is therefore a feature of the present invention to eliminate such undue stress on the locking bracket and provide a positive lock in the housing for locking the rack in shifted position. This lock is in the form of a lack bar or rod 24, disposed normal to the longitudinal dimension of the rack and parallel to and below the pinion 14, the lock bar sliding in a slot or seat 25 provided for that purpose in the housing 6 and being operatively connected to the pinion 14 by a yoke 26, integral with and upstanding transversely of or normal to the longitudinal axis of the lock bar 24. To receive the yoke, the pinion 14 has a restricted neck portion 27, bounded at one end by the base 28 of the eye 18 and at the other by an annular flange 29.

At its inner or other end 30 the lock bar 24 is tapered to facilitate its insertion and seating in one of a plurality of apertures or openings 31 of corresponding cross-section formed in and spaced longitudinally of the rack 9 below the grooves 13, the spacing of the apertures relative to the grooves being such that the lock bar 24 is aligned with an aperture when the pins 15 are in horizontal alignment and the operating handle 20 is in its locked position.

It will be seen that the spacing between the hubs 17, as determined by the length of the pins 15 of the pinion 14, is sufficient to permit withdrawal of the lock bar 24 from the rack 9. It is therefore only necessary to pull the connecting rod 19 outwardly at the start of an adjustment, to correspondingly shift the lock bar through its yoke 26 and release the rack for operation by the pins of the pinion. On completion of the adjustment, with the handle 20 normal to the connecting rod 19 and in horizontal position, the connecting rod is pushed in, again seating the lock bar in one of the apertures 31 and locking the rack 9 against movement. The locking of the handle in the locking bracket 22, alone, will restrain unseating of the lock bar 24 between adjustments. If desired, any possibility of accidental unseating may be eliminated by then locking the connecting rod 19 against axial displacement relative to its mounting bracket 22, as by a second cotter pin 32.

While some slack is permissible in the brake rigging without adverse effect upon the operation of the brakes, it is undesirable that this slack be much in excess of 1½" above the standard travel of the push rod 33 of the brake cylinder 3. It is on this basis that the adjustment obtainable by the disclosed slack adjuster 5 is predicated, the spacing of the grooves 13 in the rack 9 being such that each 180° rotation of the pinion 14 takes up some 1½" of slack. The illustrated rack has three positions beyond the initial or new brake shoe position shown in Figure 6, enabling it to take up, incrementally, a total of 4½" of slack.

It will be noted that the clevis 10 is disposed at an angle to the width of the rack 9, this angle depending upon the disposition of the brake levers in the brake rigging to which it is applied, the clevis and the levers being substantially horizontal in the disclosed embodiment. To avoid undue length in the rack 9, the housing 6 is desirably slotted as at 34 toward the clevis end of the rack to accommodate the clevis 10 and the connected end of the dead lever 2 over the last stages of adjustment. The operator is apprised that the final adjustment has been reached by engagement of the clevis 10 with the inner limits of the slot 34 in the housing. A like function is performed for the initial setting by a removable stop, such as the rivet 35, carried by the opposite end of the rack 9 exterior of the housing 6, the stop being applied after mounting of the several parts in the housing and being removable to permit subsequent disassembly of the adjuster.

From the above detailed description it will be apparent that there has been provided an improved brake slack adjuster which is simple in operation, rugged in construction, adjusts by selectively shifting the fulcrum of the deaded of the brake levers, and on adjustment is positively locked to fix the fulcrum until the next adjustment is made. It should be understood that the described and disclosed embodiment is merely exemplary of the invention and that all modifications are intended to be included which do not depart either from the spirit of the invention or the scope of the appended claims.

Having described my invention, I claim:

1. In a brake rigging including a brake lever, a slack adjuster for adjusting the fulcrum of said lever, said slack adjuster comprising shiftable rack means fulcruming said lever, and pinion means for shifting said rack means and therethrough the fulcrum of said lever.

2. In a brake rigging including a brake lever, a slack adjuster for adjusting the fulcrum of said lever, said slack adjuster comprising shiftable rack means fulcruming said lever, pinion means for shifting said rack means and therethrough the fulcrum of said lever, and lock means engageable with said rack means for locking said rack means in shifted position.

3. In a brake rigging including a brake lever, a slack adjuster for adjusting the fulcrum of said lever, said slack adjuster comprising shiftable rack means fulcruming said lever, pinion means for shifting said rack means and therethrough the fulcrum of said lever, and lock means engageable with said rack means and operatively connected to said pinion means for locking said rack means in shifted position.

4. A slack adjuster for brake rigging including a brake lever, comprising a fixed housing, rack means slidably mounted in said housing and fulcruming said lever, and pinion means for shifting said rack means and therethrough the fulcrum of said lever.

5. A slack adjuster for brake rigging having a brake lever, comprising a fixed housing, a rack slidably mounted in said housing, means on said rack for fulcruming said lever, a pinion in said housing and drivably engaging said rack for shifting the fulcrum of said lever, and means connected to and movable with said pinion and engageable with said rack for locking said rack in shifted position.

6. A slack adjuster for brake rigging having a brake lever, comprising a fixed housing, a rack slidably mounted in said housing, means on said rack for fulcruming said lever, a pinion drivably engaging said rack for shifting said rack and therethrough the fulcrum of said lever, and lock means connected to and actuated by axial movement of said pinion for locking said rack in shifted position.

7. A slack adjuster for brake rigging having a brake lever, comprising a relatively fixed housing, a rack mounted in and slidable relative to said housing, a pinion carried by said housing and drivably engaging said rack, a lock bar engageable with said rack and shiftable by axial movement of said pinion for locking said rack in shifted position, and operating means connected to said pinion and spaced from said housing for operating said rack.

8. A slack adjuster for brake rigging having a brake lever, comprising a fixed housing, a rack slidably mounted in said housing and fulcruming said lever, spaced grooves in a longitudinal edge of said rack, a pinion in said housing and drivably engaging said rack through said grooves for selectively shifting said rack and therethrough the fulcrum of said lever, apertures in said rack and spaced in correspondence with said grooves, a lock bar slidable in said apertures, means drivably connecting said lock bar and pinion for engaging and disengaging said lock bar from said rack on axial movement of said pinion, and means connected to said pinion and spaced from said housing for operating said pinion.

9. A slack adjuster for brake rigging having a brake lever, comprising a housing fixed to a railway car body intermediate sides thereof, a rack slidably mounted in said housing and fulcruming said lever, said rack having spaced grooves along a longitudinal edge thereof and apertures spaced from and in correspondence with said grooves, a pinion mounted in said housing and drivably engageable with said rack through said grooves, a lock bar slidable in said housing and selectively seatable in said apertures, and means connecting said lock bar for movement with said pinion on axial displacement thereof for selectively moving said lock bar into and out of said apertures.

10. A slack adjuster for brake rigging having a brake lever, comprising a housing fixed to an underside of a car body intermediate sides thereof, a rack slidably mounted in said housing and fulcruming said lever, said rack having spaced grooves on a longitiudinal edge thereof and apertures spaced from and in correspondence with the spacing of said grooves, a pinion drivably connected to said rack through said grooves for shifting said rack and therethrough the fulcrum of said lever, a lock bar slidable in said housing and selectively unseatable in said apertures for locking said lock bar in shifted position, means connecting said lock bar and pinion for engaging and disengaging said lock bar from said rack on axial movement of said pinion, and means at a side of said car body and connected to said pinion for actuating said pinion.

11. A slack adjuster for brake rigging having a brake lever, comprising a housing fixed to an underside of a railway car body, a rack slidably mounted in said housing and fulcruming said lever, said rack having spaced grooves in a longitudinal edge thereof and apertures spaced from and in correspondence with the spacing of said grooves, a pinion slidably and rotatably mounted in said housing, a pair of pins on said pinion spaced in correspondence and selectively engageable with said grooves for drivably connecting said rack and pinion, a lock bar in said housing and reciprocable therein parallel to the axis of said pinion, a yoke on said lock bar and connected to said pinion for moving said lock bar axially with said pinion, and means on a side of said vehicle and connected to said pinion for moving said pinion axially and rotatably thereby to selectively shift said rack and lock said rack in shifted position.

12. A slack adjuster for brake rigging having a brake lever, comprising a fixed housing, a rack slidably mounted in said housing and fulcruming said lever, grooves in and spaced longitudinally of said rack, a pinion rotatably mounted in said housing, and a pair of pins on said pinion spaced in correspondence and selectively engageable with said grooves for drivably connecting said rack and pinion.

13. A slack adjuster for brake rigging having a brake lever, comprising a fixed housing, a rack slidably mounted in said housng and fulcruming said lever, said rack having spaced grooves in a longitudinal edge thereof and apertures spaced from and in correspondence with the spacing of said grooves, a pinion slidably and rotatably mounted in said housing, a pair of pins on said pinion spaced in correspondence and selectively engageable with said grooves for drivably connecting said rack and pinion, a lock bar in said housing and reciprocable therein parallel to the rotative axis of said pinion, and means connecting said lock bar for movement with said pinion on axial displacement thereof for selectively seating said lock bar in said apertures to lock said rack in shifted position.

References Cited in the file of this patent

UNITED STATES PATENTS

| | | |
|---|---|---|
| 15,510 | Drummond | Aug. 12, 1856 |
| 36,995 | Dickson | Nov. 25, 1862 |
| 58,478 | Reynolds | Oct. 2, 1866 |
| 734,420 | Kirkhuff | July 21, 1903 |
| 831,379 | Runge | Sept. 18, 1906 |
| 1,114,896 | MacRae | Oct. 27, 1914 |
| 1,215,949 | Masson | Feb. 13, 1917 |
| 1,291,470 | Frazier | Jan. 14, 1919 |
| 1,320,347 | Strong | Oct. 28, 1919 |
| 1,460,359 | Maclear | June 26, 1923 |
| 1,767,403 | Sanvage | June 24, 1930 |
| 1,834,081 | Wrigley | Dec. 1, 1931 |
| 1,964,138 | Pietzsch et al. | June 26, 1934 |
| 2,118,389 | Aikman | May 24, 1938 |
| 2,192,016 | Petitjean | Feb. 27, 1940 |
| 2,307,886 | Hansson | Jan. 12, 1943 |
| 2,559,779 | Martin | July 10, 1951 |

FOREIGN PATENTS

| | | |
|---|---|---|
| 493,765 | Germany | Mar. 12, 1930 |